(12) United States Patent
Epstein et al.

(10) Patent No.: US 8,690,373 B2
(45) Date of Patent: *Apr. 8, 2014

(54) BACK-LIT DISPLAYS WITH HIGH ILLUMINATION UNIFORMITY

(75) Inventors: Kenneth A. Epstein, St. Paul, MN (US); Kenneth J. Hanley, Inver Grove Heights, MN (US); Gary T. Boyd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 730 days.

This patent is subject to a terminal disclaimer.

(21) Appl. No.: 12/514,944

(22) PCT Filed: Nov. 14, 2007

(86) PCT No.: PCT/US2007/084645
§ 371 (c)(1), (2), (4) Date: Feb. 10, 2010

(87) PCT Pub. No.: WO2008/061125
PCT Pub. Date: May 22, 2008

(65) Prior Publication Data
US 2010/0135004 A1    Jun. 3, 2010

Related U.S. Application Data

(60) Provisional application No. 60/865,944, filed on Nov. 15, 2006.

(51) Int. Cl.
*G09F 13/04* (2006.01)
*G09F 13/08* (2006.01)

(52) U.S. Cl.
USPC .......................................... 362/97.2; 349/64

(58) Field of Classification Search
USPC .................................. 362/97.1–97.4; 349/64
See application file for complete search history.

(56) References Cited

U.S. PATENT DOCUMENTS

| | | |
|---|---|---|
| 3,566,102 A | 2/1971 | Choyke, Jr. |
| 3,721,818 A | 3/1973 | Stahlhut |
| 4,173,399 A | 11/1979 | Yevick |
| 4,268,118 A | 5/1981 | Palmquist et al. |

(Continued)

FOREIGN PATENT DOCUMENTS

| | | |
|---|---|---|
| CN | 1641432 | 7/2005 |
| CN | 1690841 | 11/2005 |

(Continued)

OTHER PUBLICATIONS

"3M™ Image Directing Film (IDF) II—Sending light off in the right direction," 1996.

(Continued)

*Primary Examiner* — Jason M Han
(74) *Attorney, Agent, or Firm* — Jay R. Pralle; Lisa P. Fulton

(57) ABSTRACT

A directly illuminated display unit includes a display panel and one or more light sources disposed behind the display panel. The light sources are capable of producing illumination light. A diffusive light diverting layer is disposed between the one or more light sources and the display panel. The light diverting layer comprises first light diverting elements disposed on one of a first side of the light diverting layer facing display panel and second light diverting elements disposed on a second side of the light diverting layer facing away from the display panel. The diffusive light diverting layer further comprises diffusing particles disposed within a polymeric matrix.

13 Claims, 13 Drawing Sheets

(56) References Cited

U.S. PATENT DOCUMENTS

| | | |
|---|---|---|
| 4,497,860 A | 2/1985 | Brady, Jr. |
| 4,708,435 A | 11/1987 | Yata et al. |
| 4,791,540 A | 12/1988 | Dreyer, Jr. et al. |
| 4,883,341 A | 11/1989 | Whitehead |
| 5,161,041 A | 11/1992 | Abileah et al. |
| 5,659,410 A | 8/1997 | Koike et al. |
| 5,751,388 A | 5/1998 | Larson |
| 5,793,456 A | 8/1998 | Broer et al. |
| 5,825,543 A | 10/1998 | Ouderkirk et al. |
| 5,867,316 A | 2/1999 | Carlson et al. |
| 5,882,774 A | 3/1999 | Jonza et al. |
| 5,887,964 A | 3/1999 | Higuchi et al. |
| 5,914,759 A | 6/1999 | Higuchi et al. |
| 5,919,551 A | 7/1999 | Cobb |
| 6,031,664 A | 2/2000 | Goto |
| 6,055,108 A | 4/2000 | Dreyer |
| 6,122,103 A | 9/2000 | Perkins et al. |
| 6,151,169 A | 11/2000 | Kim |
| RE37,377 E | 9/2001 | Gunjima et al. |
| 6,356,389 B1 | 3/2002 | Nilsen et al. |
| 6,595,652 B2 | 7/2003 | Oda et al. |
| 6,617,784 B1 | 9/2003 | Abe et al. |
| 6,666,569 B2 | 12/2003 | Obata |
| 6,799,859 B1 | 10/2004 | Ida et al. |
| 6,827,456 B2 | 12/2004 | Parker |
| 6,827,458 B2 | 12/2004 | Suga |
| 6,846,089 B2 | 1/2005 | Stevenson et al. |
| 6,917,399 B2 | 7/2005 | Pokorny et al. |
| 6,981,776 B2 | 1/2006 | Lee |
| 6,997,595 B2 | 2/2006 | Mi et al. |
| 7,063,448 B2 | 6/2006 | Kang et al. |
| 7,072,109 B2 | 7/2006 | Goto et al. |
| 7,125,154 B2 | 10/2006 | Blanc |
| 7,220,036 B2 | 5/2007 | Yi et al. |
| 7,303,323 B2 | 12/2007 | Choi et al. |
| 7,309,153 B2 | 12/2007 | Arihara |
| 7,322,731 B2 | 1/2008 | Epstein et al. |
| 7,408,708 B2 | 8/2008 | Goto et al. |
| 7,457,510 B2 | 11/2008 | Lee et al. |
| 7,478,913 B2 | 1/2009 | Epstein et al. |
| 7,654,723 B2 | 2/2010 | Chang |
| 7,661,863 B2 | 2/2010 | Kohara et al. |
| 7,663,712 B2 | 2/2010 | Lee |
| 7,665,876 B2 | 2/2010 | Taya et al. |
| 2003/0118805 A1 | 6/2003 | Kretman et al. |
| 2003/0184993 A1 | 10/2003 | Yamada |
| 2003/0214812 A1 | 11/2003 | Bourdelais et al. |
| 2004/0076396 A1 | 4/2004 | Suga |
| 2004/0085749 A1 | 5/2004 | Parker et al. |
| 2004/0246697 A1 | 12/2004 | Yamashita et al. |
| 2005/0052750 A1 | 3/2005 | King et al. |
| 2005/0094295 A1 | 5/2005 | Yamashita et al. |
| 2005/0146872 A1 | 7/2005 | Chang et al. |
| 2005/0196122 A1 | 9/2005 | Tseng |
| 2005/0243551 A1 | 11/2005 | Onishi et al. |
| 2005/0270654 A1 | 12/2005 | Goto et al. |
| 2005/0280752 A1 | 12/2005 | Kim et al. |
| 2006/0033859 A1 | 2/2006 | Yun |
| 2006/0082698 A1 | 4/2006 | Ko et al. |
| 2006/0082700 A1 | 4/2006 | Gehlsen et al. |
| 2006/0098434 A1 | 5/2006 | Liu et al. |
| 2006/0114369 A1 | 6/2006 | Lee et al. |
| 2006/0250544 A1 | 11/2006 | Ohkawa |
| 2006/0262555 A1 | 11/2006 | Yi et al. |
| 2006/0290844 A1 | 12/2006 | Epstein et al. |
| 2007/0002588 A1 | 1/2007 | Tseng |
| 2007/0030415 A1 | 2/2007 | Epstein |
| 2007/0047254 A1 | 3/2007 | Schardt et al. |
| 2008/0049419 A1 | 2/2008 | Ma et al. |
| 2008/0094845 A1 | 4/2008 | Kusano |
| 2008/0111947 A1 | 5/2008 | Epstein et al. |
| 2008/0111948 A1 | 5/2008 | Epstein et al. |
| 2008/0112184 A1 | 5/2008 | Epstein et al. |
| 2009/0225538 A1 | 9/2009 | Horikoshi et al. |

FOREIGN PATENT DOCUMENTS

| | | |
|---|---|---|
| JP | 08-262206 | 10/1996 |
| JP | 09-101521 | 4/1997 |
| JP | 9-166713 | 6/1997 |
| JP | 11-147255 | 6/1999 |
| JP | 2000-056107 | 2/2000 |
| JP | 2001-202814 | 7/2001 |
| JP | 2002-133930 | 5/2002 |
| JP | 2002-352611 | 12/2002 |
| JP | 2005-301183 | 10/2005 |
| JP | 2006-309103 | 11/2006 |
| KR | 10-1999-0078225 | 10/1999 |
| KR | 10-2003-0097143 | 12/2003 |
| KR | 10-2004-0019752 | 3/2004 |
| WO | WO 2004/053538 | 6/2004 |
| WO | WO 2006/026743 | 3/2006 |
| WO | WO 2006/044292 | 4/2006 |
| WO | WO 2006/076399 | 7/2006 |
| WO | 2006/099375 | 9/2006 |
| WO | 2006/107621 | 10/2006 |

OTHER PUBLICATIONS

"3M™ Diffusing Film Alternative (DFA)—Maximum uniformity and efficiency in flat panel displays," 1996.

"3M™ Brightness Enhancement Film (BEF) I—The original bright idea," 1996.

"3M™ Transmissive Right Angle Film (TRAF) II—All the right angles to do two jobs," 1996.

"DNP Optical Sheets" dated Feb. 14, 2006, Display Components Development Department, R&D Division, Display Components Operations, Dai Nippon Printing Co., Ltd. © 2006 Dai Nippon Printing Co., Ltd.

U.S. Appl. No. 60/865,944, titled "Back-lit Displays with High Illumination Uniformity", filed Nov. 15, 2006.

Final Office Action issued for U.S. Appl. No. 11/129,942, dated May 26, 2009.

BACK-LIT DISPLAYS WITH HIGH ILLUMINATION UNIFORMITY

CROSS REFERENCE TO RELATED APPLICATIONS

This application is a national stage filing under 35 U.S.C. §371 of PCT/US2007/084645, filed Nov. 14, 2007, which claims priority to U.S. Provisional Application No. 60/865,944, filed Nov. 15, 2006, the disclosure of which is incorporated by reference in their entirety herein.

This application is related to the following U.S. Patent Applications which are incorporated by reference: U.S. patent application Ser. No. 11/560,234, filed on Nov. 15, 2006; U.S. patent application Ser. No. 11/560,271, filed on Nov. 15, 2006; U.S. patent application Ser. No. 11/560,260; and U.S. application Ser. No. 11/560,250, filed on Nov. 15, 2006.

FIELD OF THE INVENTION

The invention relates to optical displays, and more particularly to liquid crystal displays (LCDs) that are directly illuminated by light sources from behind, such as may be used in LCD monitors and LCD televisions.

BACKGROUND

Some display systems, for example liquid crystal displays (LCDs), are illuminated from behind. Such displays find widespread application in many devices such as laptop computers, hand-held calculators, digital watches, televisions and the like. Some backlit displays include a light source that is located to the side of the display, with a light guide positioned to guide the light from the light source to the back of the display panel. Other backlit displays, for example some LCD monitors and LCD televisions (LCD-TVs), are directly illuminated from behind using a number of light sources positioned behind the display panel. This latter arrangement is increasingly common with larger displays because the light power requirements, needed to achieve a certain level of display brightness, increase with the square of the display size, whereas the available real estate for locating light sources along the side of the display only increases linearly with display size. In addition, some display applications, such as LCD-TVs, require that the display be bright enough to be viewed from a greater distance than other applications. In addition, the viewing angle requirements for LCD-TVs are generally different from those for LCD monitors and hand-held devices.

Many LCD monitors and LCD-TVs are illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is typically used to smooth the illumination profile at the back of the LCD device.

A diffuse reflector is used behind the lamps to direct light towards the viewer, with the lamps being positioned between the reflector and the diffuser. The separation between the diffuse reflector and the diffuser is limited by the desired brightness uniformity of the light emitted from the diffuser. If the separation is too small, then the illuminance becomes less uniform, thus spoiling the image viewed by the viewer. This comes about because there is insufficient space for the light to spread uniformly between the lamps.

SUMMARY OF THE INVENTION

One embodiment of the invention is directed to a directly illuminated display unit that includes a display panel and one or more light sources disposed behind the display panel. The light sources are capable of producing illumination light. A diffusive light diverting layer is disposed between the one or more light sources and the display panel. The light diverting layer comprises first light diverting elements disposed on one of a first side of the light diverting layer facing display panel and second light diverting elements disposed on a second side of the light diverting layer facing away from the display panel. The diffusive light diverting layer further comprises diffusing particles disposed within a polymeric matrix.

The above summary of the present invention is not intended to describe each illustrated embodiment or every implementation of the present invention. The figures and the following detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION

The present invention is applicable to display panels, such as liquid crystal displays (LCDs, or LC displays), and is particularly applicable to LCDs that are directly illuminated from behind, for example as are used in LCD monitors and LCD televisions (LCD-TVs). More specifically, the invention is directed to the management of light generated by a direct-lit backlight for illuminating an LC display. An arrangement of light management films is typically positioned between the backlight and the display panel itself. The arrangement of light management films, which may be laminated together or may be free standing, typically includes a diffuser layer and at least one brightness enhancement film having a prismatically structured surface.

Figure 1:
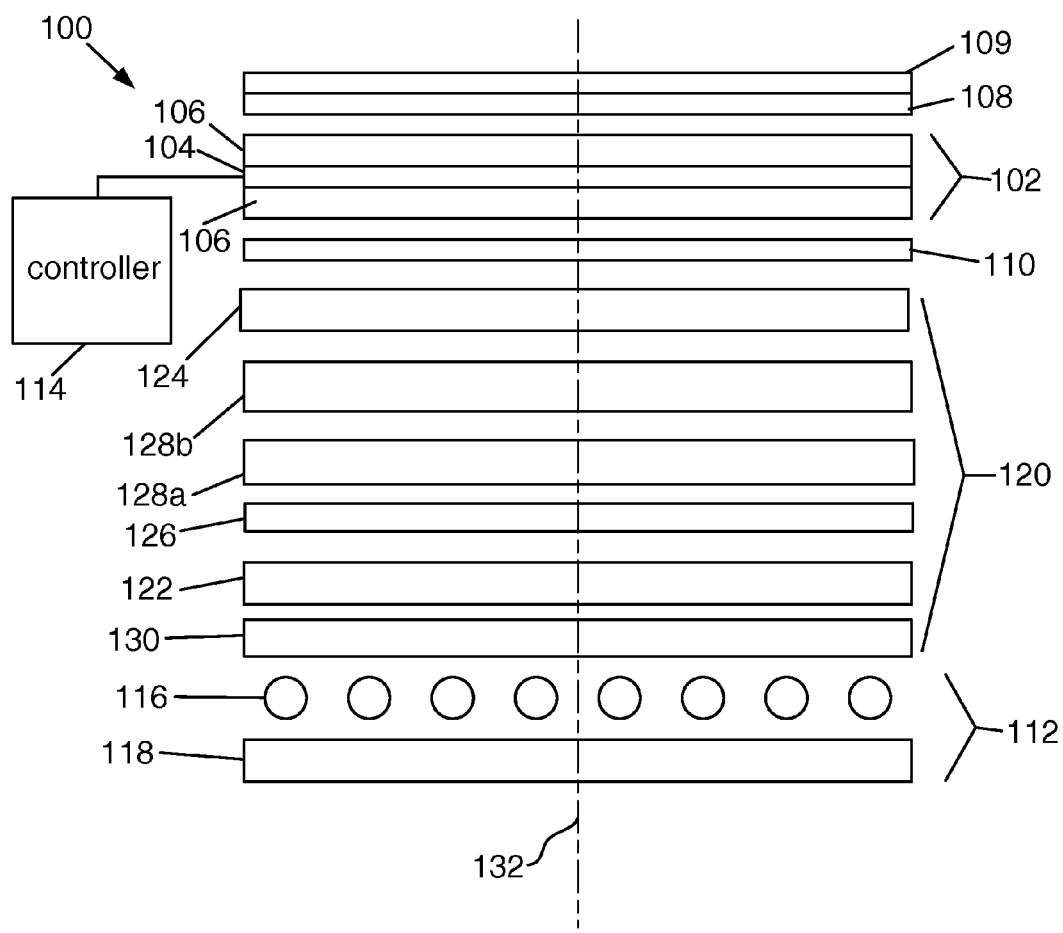
FIG. 1 schematically illustrates a back-lit liquid crystal display device that uses a brightness uniformizing layer according to principles of the present invention.

A schematic exploded view of an exemplary embodiment of a direct-lit display device 100 is presented in FIG. 1. Such a display device 100 may be used, for example, in an LCD monitor or LCD-TV. The display device 100 may be based on the use of an LC panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent areas. A color filter may also be included with one or more of the plates 106 for imposing color on the image displayed.

An upper absorbing polarizer 108 is positioned above the LC layer 104 and a lower absorbing polarizer 110 is positioned below the LC layer 104. In the illustrated embodiment, the upper and lower absorbing polarizers are located outside the LC panel 102. The absorbing polarizers 108, 110 and the LC panel 102 in combination control the transmission of light from the backlight 112 through the display 100 to the viewer. For example, the absorbing polarizers 108, 110 may be arranged with their transmission axes perpendicular. In an unactivated state, a pixel of the LC layer 104 may not change the polarization of light passing therethrough. Accordingly, light that passes through the lower absorbing polarizer 110 is absorbed by the upper absorbing polarizer 108. When the pixel is activated, on the other, hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example by a controller 114, results in the light passing out of the display at certain desired locations, thus forming an image seen by the viewer. The controller may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

It will be appreciated that some type of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 112 includes a number of light sources 116 that generate the light that illuminates the LC panel 102. The light sources 116 used in a LCD-TV or LCD monitor are often linear, cold cathode, fluorescent tubes that extend along the height of the display device 100. Other types of light sources may be used, however, such as filament or arc lamps, light emitting diodes (LEDs), flat fluorescent panels or external fluorescent lamps. This list of light sources is not intended to be limiting or exhaustive, but only exemplary.

The backlight 112 may also include a reflector 118 for reflecting light propagating downwards from the light sources 116, in a direction away from the LC panel 102. The reflector 118 may also be useful for recycling light within the display device 100, as is explained below. The reflector 118 may be a specular reflector or may be a diffuse reflector. One example of a specular reflector that may be used as the reflector 118 is Vikuiti™ Enhanced Specular Reflection (ESR) film available from 3M Company, St. Paul, Minn. Examples of suitable diffuse reflectors include polymers, such as PET, PC, PP, PS loaded with diffusely reflective particles, such as titanium dioxide, barium sulphate, calcium carbonate or the like. Other examples of diffuse reflectors, including microporous materials and fibril-containing materials, are discussed in co-owned U.S. Patent Application Publication 2003/0118805 A1.

An arrangement 120 of light management films, which may also be referred to as a light management unit, is positioned between the backlight 112 and the LC panel 102. The light management films affect the light propagating from backlight 112 so as to improve the operation of the display device 100. For example, the arrangement 120 of light management films may include an optional diffuser plate 122. The diffuser plate 122 may be used to diffuse the light received from the light sources, which results in an increase in the uniformity of the illumination light incident on the LC panel 102. Consequently, this results in an image perceived by the viewer that is more uniformly bright. In some embodiments the diffuser plate 122 may be formed as a layer that contains bulk diffusing particles. In some embodiments, the diffuser plate may be attached to another layer in the arrangement of light management films 120 or may be omitted.

The light management unit 120 may also include a reflective polarizer 124. The light sources 116 typically produce unpolarized light but the lower absorbing polarizer 110 only transmits a single polarization state, and so about half of the light generated by the light sources 116 is not transmitted through to the LC layer 104. The reflecting polarizer 124, however, may be used to reflect the light that would otherwise be absorbed in the lower absorbing polarizer, and so this light may be recycled by reflection between the reflecting polarizer 124 and the reflector 118. At least some of the light reflected by the reflecting polarizer 124 may be depolarized, and subsequently returned to the reflecting polarizer 124 in a polarization state that is transmitted through the reflecting polarizer 124 and the lower absorbing polarizer 110 to the LC layer 104. In this manner, the reflecting polarizer 124 may be used to increase the fraction of light emitted by the light sources 116 that reaches the LC layer 104, and so the image produced by the display device 100 is brighter.

Any suitable type of reflective polarizer may be used, for example, multilayer optical film (MOF) reflective polarizers; diffusely reflective polarizing film (DRPF), such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774. Commercially available examples of MOF reflective polarizers include Vikuiti™ DBEF-D200 and DBEF-D440 multilayer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, and diffusely reflecting multilayer polarizers as described in e.g. co-owned U.S. Pat. No. 5,867,316. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizer useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

In some embodiments, the reflective polarizer 126 may provide diffusion, for example with a diffusing surface facing the backlight 112. In other embodiments, the reflective polarizer 126 may be provided with a brightness enhancing surface that increases the gain of the light that passes through the reflective polarizer 126. For example, the upper surface of the reflective polarizer 126 may be provided with a prismatic brightness enhancing surface or with a gain diffusing surface. Brightness enhancing surfaces are discussed in greater detail below. In other embodiments, the reflective polarizer may be provided with a diffusing feature, such as a diffusing surface or volume, on the side facing the backlight 112 and with a brightness enhancing feature, such as a prismatic surface or gain diffusing surface, on the side facing the LC panel 102.

A polarization control layer 126 may be provided in some exemplary embodiments, for example between the diffuser plate 122 and the reflective polarizer 124. Examples of polarization control layer 126 include a quarter wave retarding layer and a polarization rotating layer, such as a liquid crystal polarization rotating layer. A polarization control layer 126 may be used to change the polarization of light that is reflected from the reflective polarizer 124 so that an increased fraction of the recycled light is transmitted through the reflective polarizer 124.

The arrangement 120 of light management layers may also include one or more brightness enhancing layers. A brightness enhancing layer is one that includes a surface structure that redirects off-axis light in a direction closer to the axis 132 of the display. This increases the amount of light propagating on-axis through the LC layer 104, thus increasing the brightness of the image seen by the viewer. One example is a prismatic brightness enhancing layer, which has a number of prismatic ridges that redirect the illumination light, through refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT.

A prismatic brightness enhancing layer typically provides optical gain in one dimension. A second brightness enhancing layer 128b may also be included in the arrangement 120 of light management layers, in which a prismatic brightness enhancing layer is arranged with its prismatic structure oriented orthogonally to the prismatic structure of the first brightness enhancing layer 128a. Such a configuration provides an increase in the optical gain of the display unit in two dimensions. In the illustrated embodiment, the brightness enhancing layers 128a, 128b are be positioned between the backlight 112 and the reflective polarizer 124. In other embodiments, the brightness enhancing layers 128a and 128b may be disposed between the reflective polarizer 124 and the LC panel 102.

Another type of brightness enhancing layer 128a that may be used to increase the on-axis brightness of the light passing through the display is a gain diffusing layer. One example of a gain diffuser layer is a layer that is provided with an arrangement of elements that act as lenses on its upper surface. At least some of the light that passes out of the gain diffuser layer 128a that would otherwise propagate at a relative large angle to the axis 132 of the display is redirected by the elements on the layer surface to propagate in a direction more parallel to the axis 132. More than one gain diffusing brightness enhancing layers 128a may be used. For example two or three gain diffusing layers 128a, 128b may be used. In addition, one or more gain diffusing layers 128a may be used along with one or more prismatic brightness enhancing films 128b. In such a case, the gain diffusing films 128a and prismatic brightness enhancing layers 128b may be placed in any desired order within the arrangement of light management films 120. One example of a gain diffuser layer that may be used in a display is a type BS-42 film available from Keiwa Inc., Osaka, Japan.

The different layers in the light management unit may be free standing. In other embodiments, two or more of the layers in the light management unit may be laminated together, for example as discussed in co-owned U.S. patent application Ser. No. 10/966,610. In other exemplary embodiments, the light management unit may include two subassemblies separated by a gap, for example as described in co-owned U.S. patent application Ser. No. 10/965,937.

Conventionally, the spacing between the light sources 116 and the diffuser layer 122, the spacing between adjacent light sources 116 and the diffuser transmission are significant factors considered in designing the display for a given value of brightness and uniformity of illumination. Generally, a strong diffuser, i.e. a diffuser that diffuses a higher fraction of the incident light, will improve the uniformity but will also result in reduced brightness, because the high diffusing level is accompanied by strong back diffusion and a concomitant increase in losses.

Under normal diffusion conditions, the variations in brightness seen across a screen are characterized by brightness maxima located above the light sources, and brightness minima located between the light sources. An enhanced uniformity film (EUF) 130 may be positioned between the light sources 116 and the diffuser layer 122 to reduce the nonuniformity in the illumination of the display panel 102. Each face of the EUF 130, namely the side facing towards the light sources 116 and the side facing towards the display panel 102, may be a light-diverting surface. The light diverting surfaces are formed by a number of light diverting elements that refractively divert light passing from one side of the EUF 130 to another in a manner that reduces the illumination non-uniformity. The light diverting elements comprise a portion of the EUF surface that is non-parallel to the plane of the EUF 130. The EUF 130 itself may be diffusive, for example through the inclusion of diffusing particles within the EUF 130. The diffusing particles may be particles of a material having a different refractive index from that of the polymeric matrix of the EUF 130. For example, the diffusing particles may be formed of a different polymer from the matrix of the EUF or formed of an inorganic substance, such as glass or the like. The size of the diffusing particles and the loading in the polymer matrix may be selected to provide desired diffusing characteristics.

Figure 2:
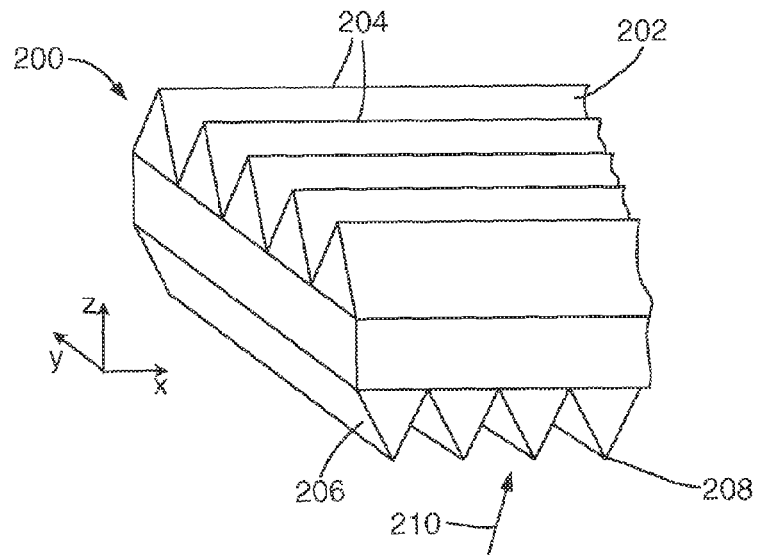
FIG. 2 schematically illustrates an embodiment of an enhanced uniformity film (EUF) according to principles of the present invention.

One particular exemplary embodiment of EUF 200 is schematically illustrated in FIG. 2. The EUF 200 comprises a first light diverting surface 202 that includes first light diverting elements 204. In this particular embodiment, the light diverting elements 204 are formed as ribs across the surface of the EUF 200 and have a triangular cross-section. The second light diverting surface 206 also includes ribbed light diverting elements 208 that have a triangular cross-section. In this configuration of EUF 200, the light diverting elements 204 and 208 are relatively oriented so that light 210 incident on the EUF 200 in a direction parallel to the z-axis from below is diverted in the x-z plane by the second light diverting surface 206. On exiting the EUF 200, light propagating within the EUF 200 parallel to the z-axis is diverted in the y-z plane by the first light diverting surface 202. Thus, since light normally incident on the film 200 is diverted in a plane parallel to the x-z plane, the elements 204 may be said to form a light diverting plane that is parallel to the x-z direction. Likewise, since light propagating within the film parallel to the z-axis is diverted in the y-z plane, the elements 208 may be said to form a light diverting plane that is parallel to the y-z direction. In this configuration, the light diverting planes arising from the light diverting elements 204 and 208 are perpendicular to each other. In other configurations, the light diverting planes may be non-parallel without being perpendicular.

In some configurations, the light diverting elements of the upper or lower side may divert light in more than one direction. In such a case, the light diverting plane is taken to mean that plane which constitutes the direction where the diversion is greatest.

In some embodiments, the EUF may itself be formed of diffusive material, for example a polymer matrix containing bulk diffusing particles. The diffusing particles may extend throughout the EUF, or may be absent from parts of the EUF such as the light diverting elements. Where the EUF is diffusive, the arrangement of light management films need not include an additional diffuser layer between the EUF and the display panel, although an additional diffuser layer may be present.

Figure 3A:
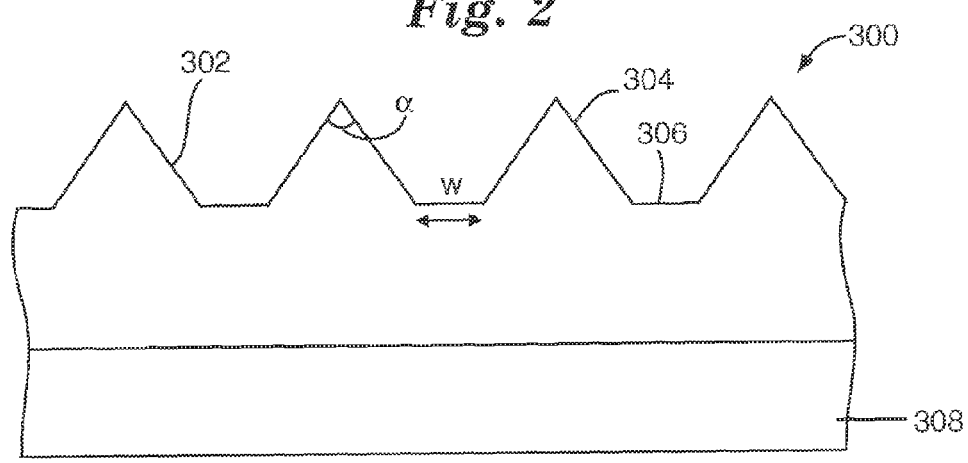
FIGS. 3A, 3B, 4A-4D, 5, 6A and 6B schematically illustrate additional embodiments of EUF according to principles of the present invention.
Figure 3B:
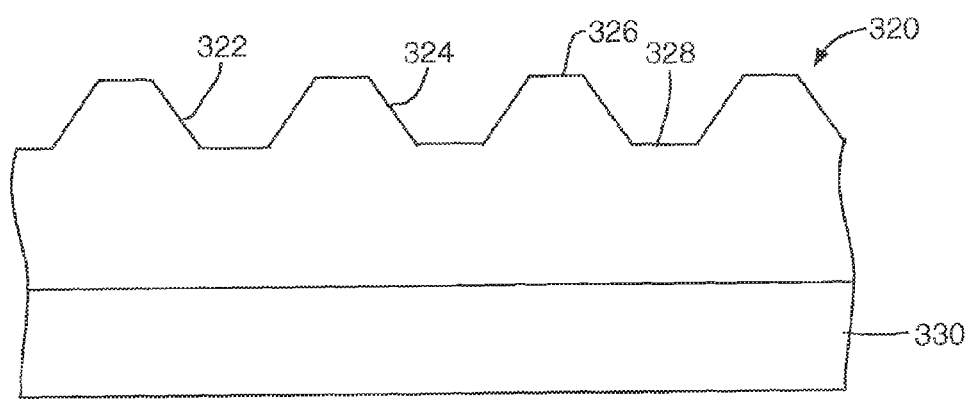

The light diverting surfaces may include light diverting elements of different shapes and may also include various portions that lie parallel to the EUF. Some additional exemplary embodiments of EUF are schematically illustrated in FIGS. 3A and 3B. In FIG. 3A, the EUF 300 has a first light diverting surface 302 that includes light diverting elements 304 having a triangular cross-sectional shape. This figure also shows a, the apex angle of a light diverting element 304. In this particular embodiment, there is a flat region 306 between adjacent light diverting elements 304 where the film surface is parallel to the plane of the EUF 300. The width of the flat region 306 is shown as "w". The lower light diverting surface 308 may have the same shape as the first light diverting surface 302, or may have a different shape.

In FIG. 3B, the EUF 320 has a light diverting surface 322 that includes light diverting elements 324 having a truncated triangular cross-sectional shape, with a top flat portion 326. In this particular embodiment, there is also a flat region 328 between adjacent light diverting elements 324. The lower light diverting surface 330 may have the same shape as the first light diverting surface 322, or may have a different shape.

Figure 4A:
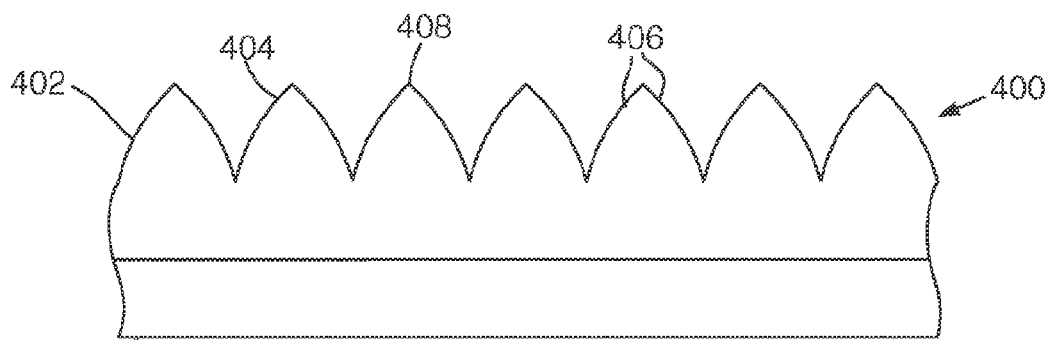
Figure 4B:
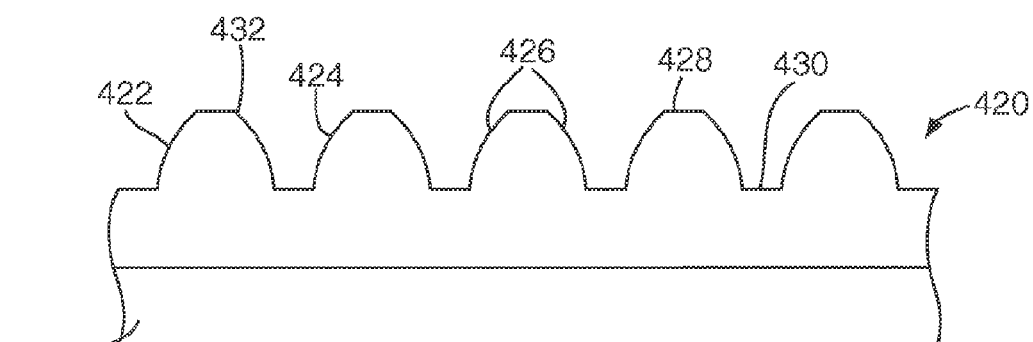
Figure 4C:
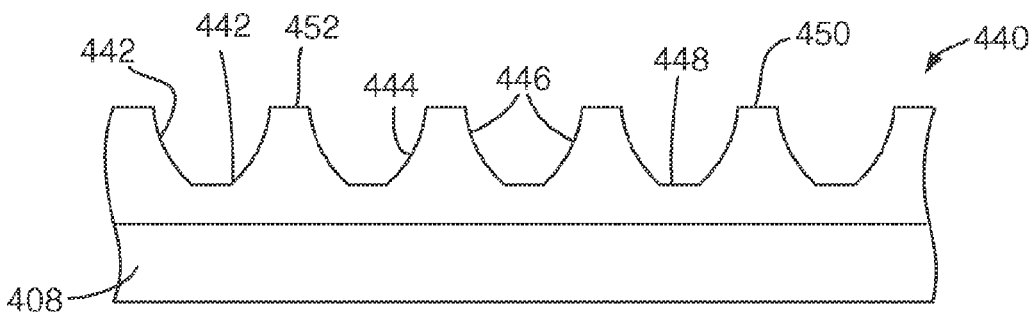

Some other exemplary embodiments of EUF are schematically illustrated in FIGS. 4A-4C. In FIG. 4A, the EUF 400 has a first light diverting surface 402 that includes light diverting elements 404 having curved faces 406. The second light diverting surface 408 may have light diverting elements having curved faces although this is not necessary. Likewise, the first light diverting surface need not have curved surfaces while the second light diverting surface does have curved surfaces. In FIG. 4B, the exemplary EUF 420 has a light diverting surface 422 with light diverting elements 424 that have curved faces 426 and flat portions 428. In the illustrated embodiment, the flat portions 428 are parallel to the plane of the EUF film 420. In some embodiments, the light diverting surface 422 may contain flat portions 430 between the light diverting elements 424. In the illustrated embodiment, the flat portions 430 are parallel to the plane of the EUF 420.

In the exemplary embodiments illustrated in FIGS. 4A and 4B, the curved surfaces of the light diverting elements 404, 424 include a relatively abrupt change in surface gradient that may be considered similar to a mathematical discontinuity. For example, an abrupt change in gradient occurs at point 408 in FIG. 4A, at the apex of the light diverting member 404, and at point 432 of the light diverting member 424 in FIG. 4B. These relatively abrupt changes in gradient prevent a single light diverting member from operating as a lens, since a lens requires smooth changes in the gradient across its surface. Thus, the light diverting members 404, 424 do not produce a single focus for parallel light passing therethrough, either a real focus or a virtual focus. It will be appreciated that any of the light diverting surfaces discussed herein may be included on a single-sided EUF, in other words one that has a light diverting surface on only one side of the film, or a two-sided EUF, one that has light diverting surfaces on both sides.

In the exemplary embodiments illustrated in FIGS. 4A and 4B, the light diverting elements 402, 422 may be viewed as protruding from the surface of the EUF 400, 420. In other embodiments, the light diverting elements may be formed as depressions in the surface of the EUF. One exemplary embodiment of such an EUF 440 is schematically illustrated in FIG. 4C. In this case, the light diverting surface 442 is formed with light diverting elements 444 having surfaces 446. In some embodiments, flat areas 448 may be provided in the depression, and flat areas 450 may be provided between light diverting elements 444. It is unimportant to the invention whether a light diverting surface contains light diverting elements that protrude out of the EUF or into the EUF and, in fact, the two configurations may in some circumstances be understood as being equivalent, with the portion 452 between two depressed light diverting elements being considered to be a light diverting element that protrudes out from the EUF.

Figure 4D:
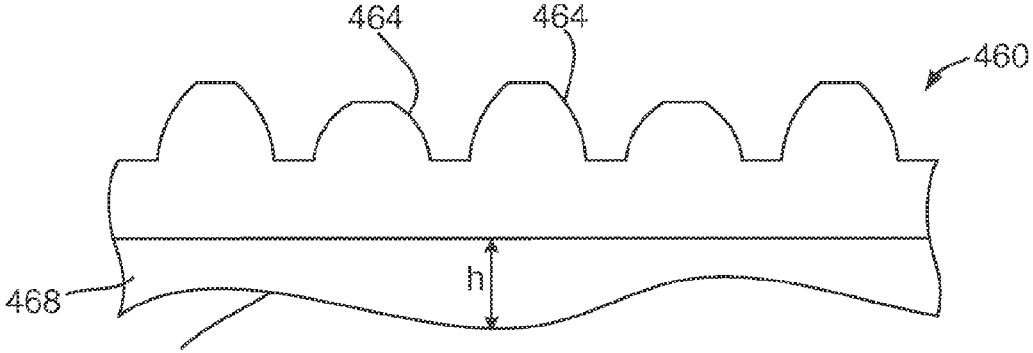

The light diverting elements need not all be of the same height. For example, as is schematically illustrated in FIG. 4D, the light diverting elements 464 may be of different heights. Also, a single light diverting element may have a height that varies along its length. For example, the light diverting element 470 on the second light diverting surface 468 has a height, h, that varies depending on the position along the film 460.

Figure 5:
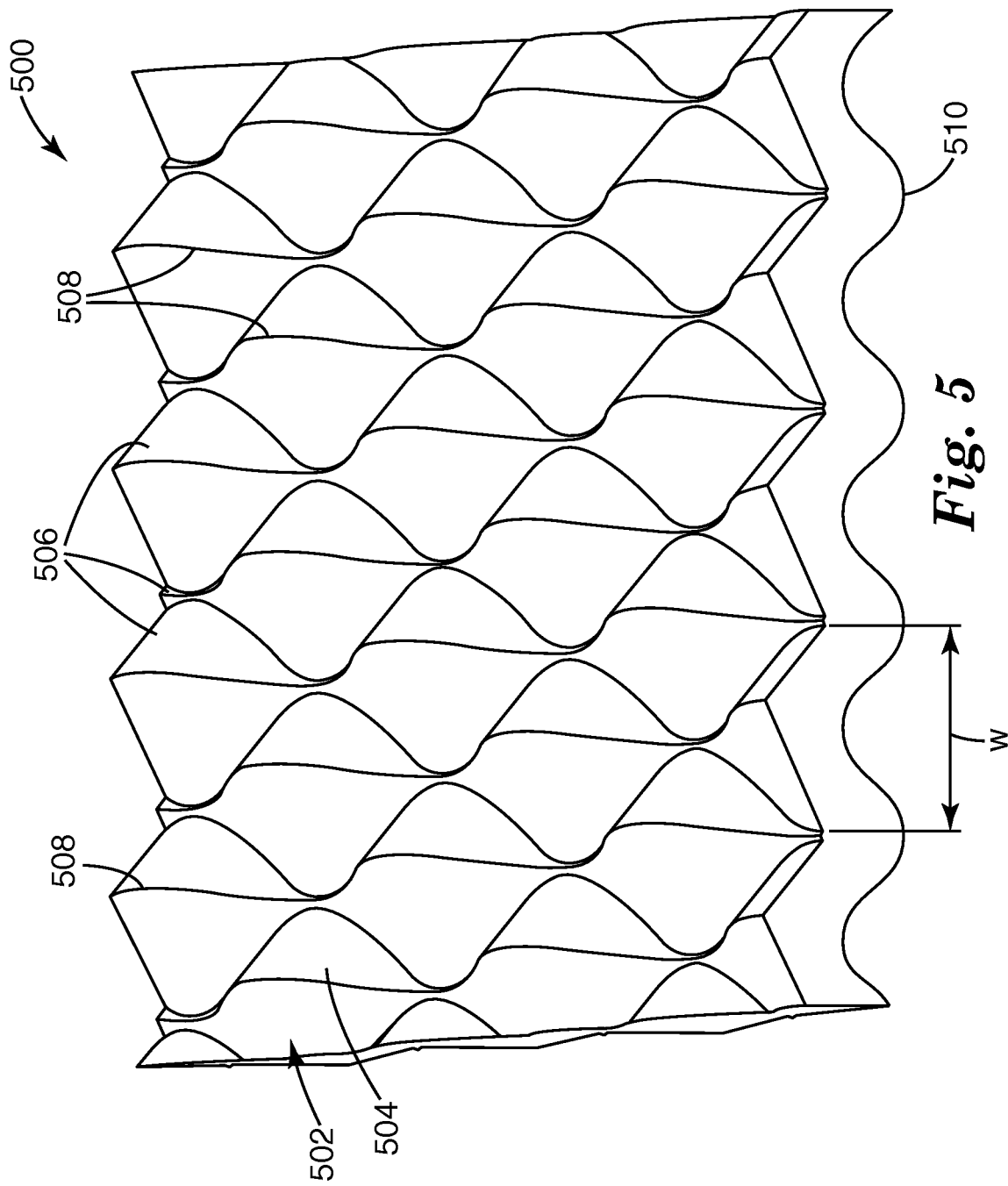

Another embodiment of a EUF whose light diverting elements vary in height is schematically illustrated in FIG. 5. The EUF 500 has a first light diverting surface 502 whose light diverting elements 504 are formed as prisms 506 having undulating ridges 508 The height of the ridges 508 varies along the prisms 506 and the width, w, also varies along the prisms 506. This type of surface is described in greater detail in U.S. patent application Ser. No. 11/467,230. The second light diverting surface 510 may contain light diverting elements of any desired shape. For example, the second light diverting surface 510 may have light diverting elements formed as prisms having undulating ridges.

Figure 6A:
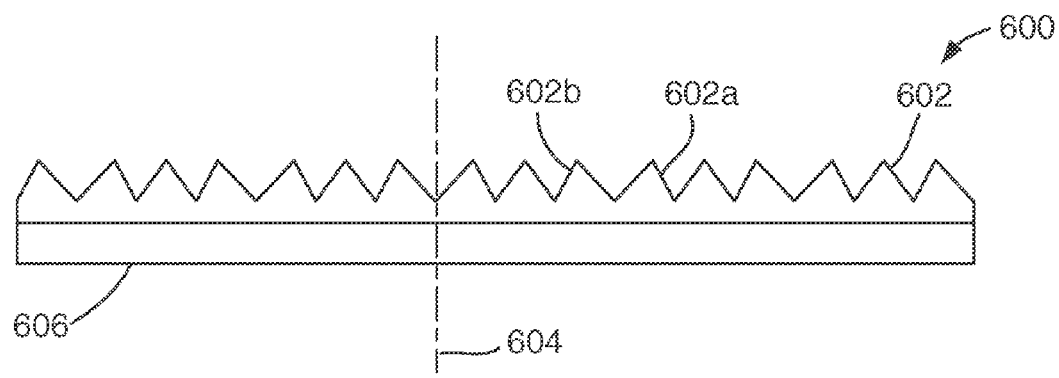

The light diverting elements need not be symmetrical relative to a normal to the EUF. One example of an EUF 600 having asymmetrical light diverting element 602 is schematically illustrated in FIG. 6A. In this particular embodiment, the light diverting elements 602 are formed as prisms having straight sides. At least some of the light diverting elements, for example light diverting elements 602a and 602b are asymmetrical relative to the axis 604 drawn normal to the EUF 600. The lower light diverting surface 606 may or may not include asymmetrical light diverting elements.

Figure 6B:
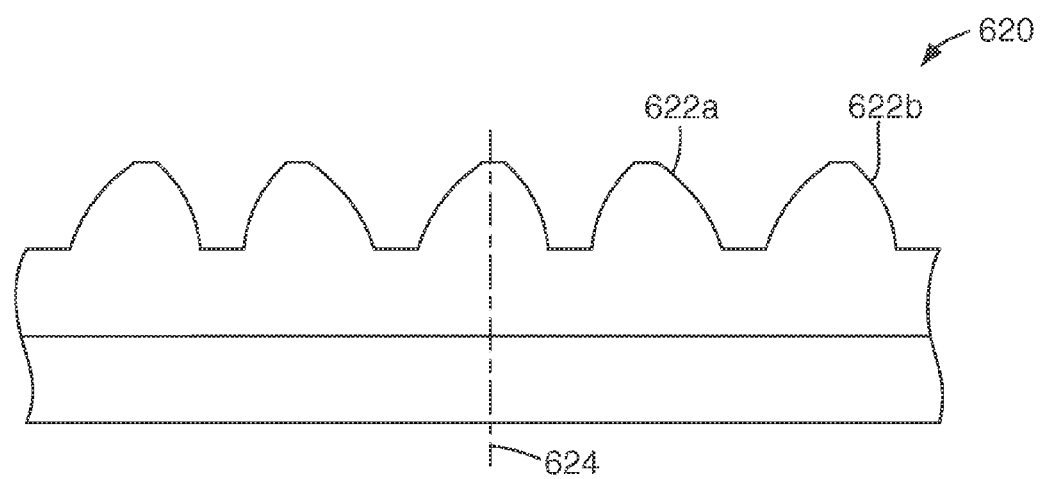

Another embodiment of an EUF 620 having asymmetrical light diverting elements 622 is schematically illustrated in FIG. 6B. At least some of the light diverting elements 622 have curved sides and are asymmetric relative to the axis 624 that is normal to the EUF 620, for example elements 622a and 622b.

Figure 7A:
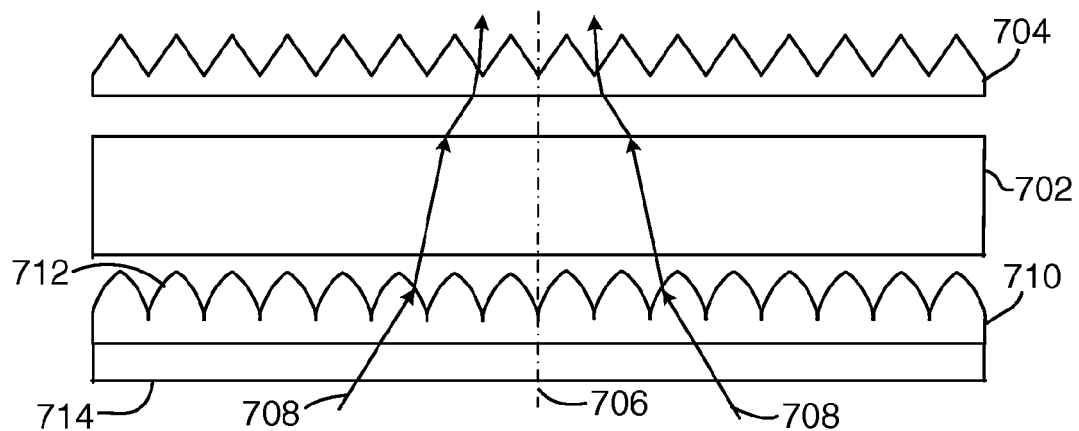
FIGS. 7A-7C schematically illustrated different embodiments of light management units that include an EUF according to principles of the present invention.

FIG. 7A schematically illustrates the use of a diffusive EUF 710 with other light management layers 704. In the illustrated embodiment, the light management layer 704 comprises a prismatic brightness enhancing layer. In other embodiments, different types of layer, or additional light management layers, such as a reflective polarizer layer, may be positioned above the diffuser layer 702. The EUF 710 is positioned on the input side of the diffuser layer 702. The EUF 710 has a first light diverting surface 712 facing the diffuser layer 702 and a second light diverting surface 714 facing away from the diffuser layer 702. Light 708 from one or more light sources (not shown) passes through the EUF 710 to the diffuser layer 702 and on to the other light management layer or layers 704.

Figure 7B:
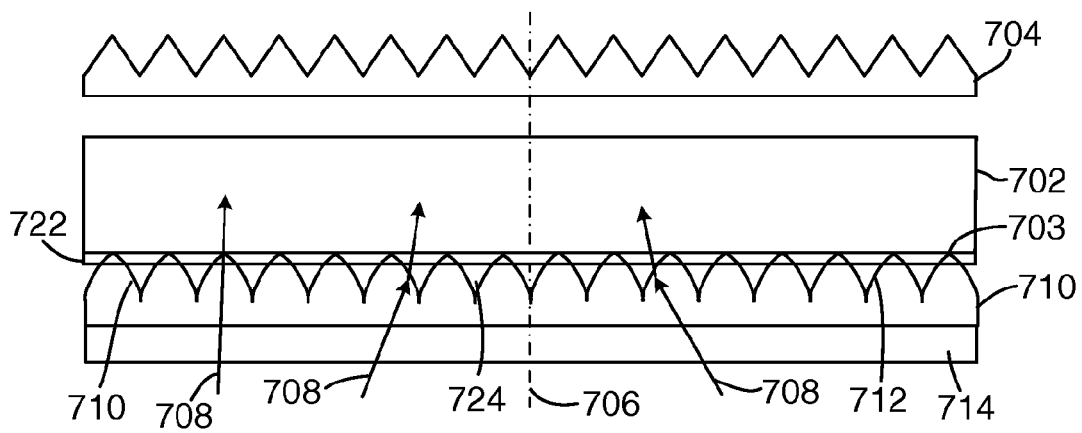

In some embodiments, the first light-diverting surface 712 may be attached to the diffuser layer 702, for example through the use of an adhesive. One exemplary embodiment of such an arrangement is schematically illustrated in FIG. 7B, in which parts of the first light diverting surface 712 penetrate into an adhesive layer 722 on the lower surface 703 of the diffuser layer 702. In some embodiments, a gap 724 remains between the adhesive layer 722 and parts of the surface 712. The attachment of structured film surfaces to other layers using adhesives is described in more detail in U.S. Pat. No. 6,846,089.

Figure 7C:
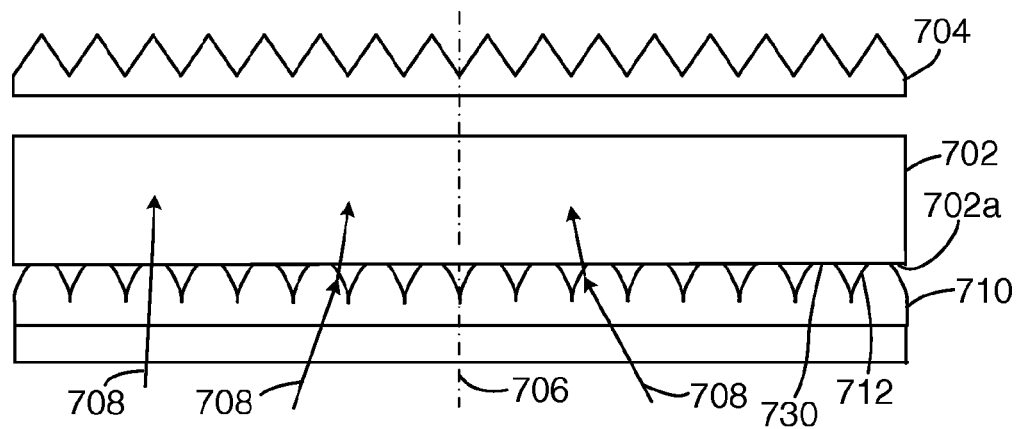

Another exemplary embodiment is schematically illustrated in FIG. 7C, in which the light-diverting surface 712 contains light diverting elements having portions 730 that are parallel to the lower surface 702a of the diffuser layer 702. The light diverting surface 712 surface may be pressed against the lower surface 702a of the diffuser layer 702, or may be adhered to the lower surface 702a, for example using an adhesive.

Model Examples

An optical ray trace model of a display's illumination unit, having a backlight and a light management unit, was constructed to investigate the optical performance of the illumination unit as a function of various parameters of an EUF. The model illumination unit 800, schematically illustrated in FIG. 8, comprised a reflective frame 802 that defines the edge limits of the light source array cavity 804, a back reflector 806 below the array of lamps 808, and an EUF 812. Unless otherwise indicated, the model assumed that the reflector 806 was a specular reflector. The model assumed that the lamps 808 each comprised a 38,000 nit elongated source, similar to a cold cathode fluorescent lamp. The lamps 808 were regularly spaced apart by a center-to-center distance S, the separation between the reflector 806 and the EUF 812 was given by D and the separation distance between the lamps 808 and the reflector 806 was H. The spacing between lamps 808, S, was assumed to be 30 mm, the diameter, 2R, of the lamps was assumed to be 3 mm and the value of D was assumed to be 7 mm. The diffusive EUF layer 812 was 2 mm thick. There were three bulbs 808 in the cavity. A brightness enhancing layer 814 and reflective polarizer layer 815 were positioned above the diffusive EUF layer 812. The brightness enhancing layer 814 was formed of prismatic ribs oriented parallel to the elongation direction of the bulbs 808.

The refractive index of the material used for the EUF was assumed to be 1.586, which corresponds to the value of the refractive index for an epoxy acrylate material, as might be used for the EUF. Other suitable types of materials for an EUF may be used. Example polymer materials include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly (methylmethacrylate) (PMMA) and PMMA copolymers; ethoxylated and propoxylated (meth)acrylates; multifunctional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly(dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly(alkane napthalates), such as poly (ethylene naphthalate)(PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends. The term (meth)acrylate is defined as being either the corresponding methacrylate or acrylate compounds.

Figure 9A:
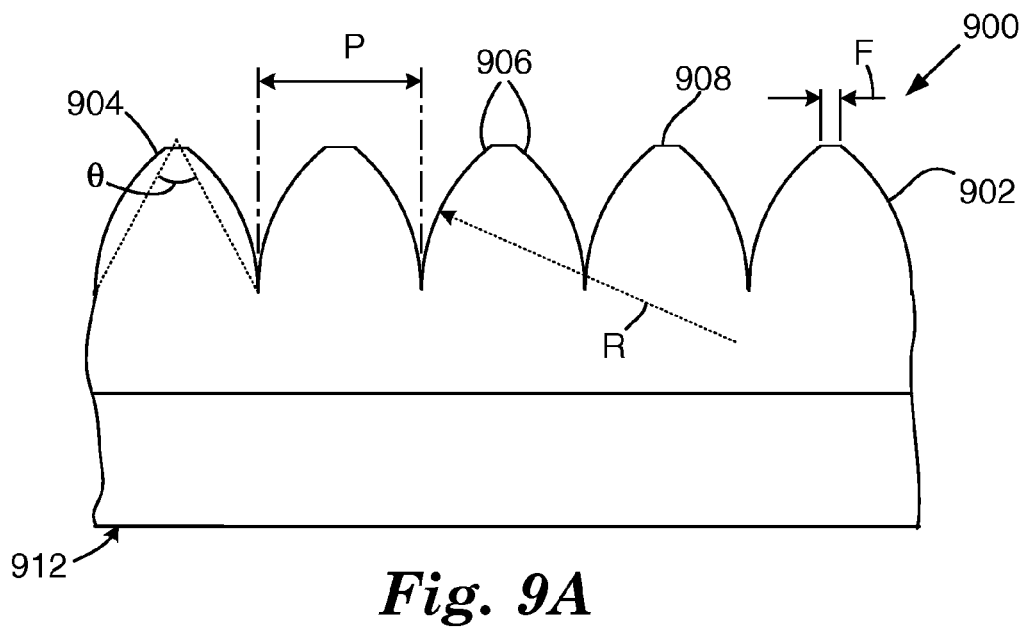
FIGS. 9A and 9B show various parameters used in modeling a EUF according to principles of the present invention.
Figure 9B:
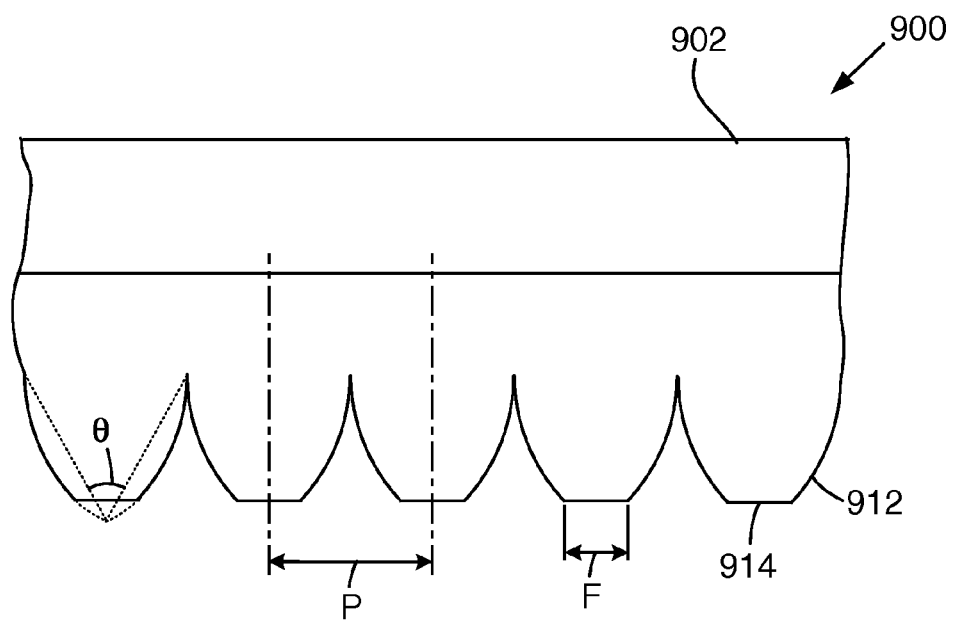

The uniformity of the light emitted from the illumination unit 800 was modeled for various shapes of light diverting surfaces on the EUF. The surfaces of the EUF 900 were modeled as shown in FIGS. 9A and 9B. The upper light diverting surface 902, facing the brightness enhancing layer, had light diverting elements 904 with curved faces 906 having a radius of curvature R. The light diverting elements 904 were assumed to be arranged with a pitch, P. R was a dimensionless number normalized to the pitch, P. Thus, if the radius of curvature is 50 times the pitch, then R has a value of 50. The apex angle of the light diverting elements, θ, was defined by the virtual triangle connecting the apex of the light diverting element 904 with the base corners of the light diverting element 904. In some cases the light diverting elements were modeled with a flat tip. The extent, F, of the flat portion 908 was varied between zero and 0.2 P. The apex angle of the light diverting element 904 having a flat portion was taken to be that which would otherwise have been the apex angle without the flat portion truncating the element 904. The lower light diverting surface 912 is shown in FIG. 9B, with light diverting elements 914 protruding out from the EUF 900.

In all the cases discussed below, the light diverting elements 904, 914 were the same size for each light diverting surface 902, 912, and had a uniform height. The behavior of the illumination unit was modeled for various values of different parameters using a Monte Carlo method.

EXAMPLES

Examples 1-6

Modeled Illumination Unit with Diffusing EUF

The optical characteristics of illumination units having several combinations of various EUF parameters were modeled. The different ranges of the various EUF parameters are listed in Table I. The term "apex" refers to the apex angle of the light diverting member, the term "flat" refers to the extent of the flat region, F, and the term "R" refers to the radius of curvature of the light diverting elements. The term "bottom" refers to the lower surface of the EUF facing the light sources and the term "top" refers to the upper surface of the EUF facing away from the light sources.

The term "diffuser-g" refers to the Henyey-Greenstein diffusion parameter: a value of g=1 results in all forward scattering and g=−1 is associated with completely backward scattering. A value of g=0 corresponds to uniform scattering in all directions. Values of g used in the modeling were in the range of 0.92-0.955, which corresponds approximately to a single pass transmission through the 2 mm thick diffusive EUF in the range 61%-79%. The angular distribution of scattered rays, $f(\theta)$ is given by $f=(1-g^2)/[2(1+g^2-2 g \cos\theta)^{1.5}]$, where $\theta$ is the angle relative to the input direction of the light ray. For these values of g the scattering is highly biased in the forward direction. The Henyey-Greenstein u-factor, describing the inverse of the mean free path for light within the diffuser, was set at 14 $mm^{-1}$. Thus, the scattering coefficient, C, is an exponential factor given by $C=e^{-ud}$, where d is the position within the diffusive EUF.

Figure 8:
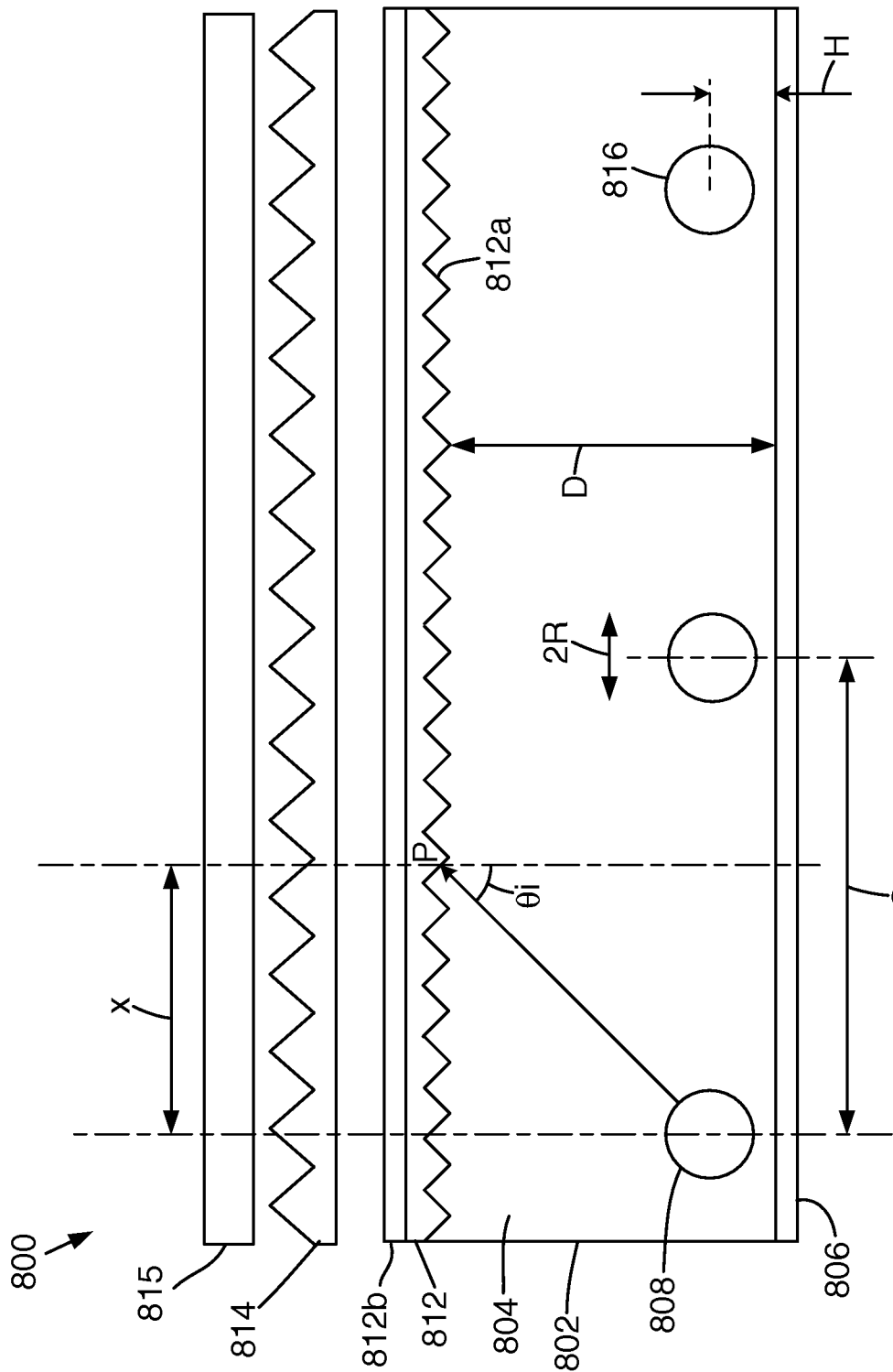
FIG. 8 schematically illustrates an embodiment of an illumination unit that includes light sources and light management films, according to principles of the present invention.

The lamp height, H, refers to the separation between the lamps and the reflector, as shown in FIG. 8. Optical losses were included in the model: the reflector was assumed to reflect 98.5% of the incident light, with the remaining 1.5% being absorbed, and the materials of the optical films were assumed to have an absorption length of $6 \times 10^{-5}$ $mm^{-1}$. The reflector was modeled as a specular reflector unless otherwise stated. The parameters A, T and R correspond to the percentages of incident light that are absorbed in the diffusive EUF, diffusely transmitted through the diffusive EUF and diffusely reflected by the diffusive EUF respectively.

TABLE I

Parameter Ranges

| Parameter | Minimum | Maximum |
|---|---|---|
| Bottom Apex (degrees) | 58 | 80 |
| Bottom Flat | 0 | 0.2 |
| Bottom Radius | 0.8 | 100 |
| Top Apex (degrees) | 70 | 110 |
| Top Flat | 0 | 0.2 |
| Top Radius | 0.8 | 100 |
| Diffuser-g | 0.92 | 0.955 |
| Lamp height, H (mm) | 0.02 | 2 |
| A (%) | 5.1 | 2.3 |
| T (%) | 60.6 | 79.5 |
| R (%) | 34.7 | 18.2 |

The actual values of the various parameters used for Examples 1A-6A are presented in Table II. Examples 1A-6A are selected from the many different combinations considered, and are exemplary of good performance in terms of overall brightness and uniformity.

TABLE II

Parameter Values for Examples 1-6

| Parameter | Ex. 1 | Ex. 2 | Ex. 3 | Ex. 4 | Ex. 5 | Ex. 6 |
|---|---|---|---|---|---|---|
| Bottom Apex (deg) | 62.0 | 63.9 | 63.7 | 62.2 | 62.2 | 66 |
| Bottom Flat | 0.16 | 0.16 | 0.12 | 0.15 | 0.13 | 0.001 |
| Bottom Radius | 3.9 | 4.3 | 5.4 | 4.1 | 5.6 | 100 |
| Top Apex (deg) | 89.1 | 90.2 | 79.5 | 89.9 | 77.3 | 100 |
| Top Flat | 0.11 | 0.10 | 0.17 | 0.12 | 0.14 | 0.001 |
| Top Radius | 0.92 | 1.14 | 0.93 | 1.02 | 0.87 | 100 |
| Diffuser-g | 0.98 | 0.98 | 0.97 | 0.97 | 0.97 | 0.97 |
| Lamp height, H (mm) | 0.89 | 0.61 | 0.47 | 0.68 | 0.42 | 0.5 |
| Cavity depth, D (mm) | 7 | 7 | 7 | 7 | 7 | 7 |

The illumination units of examples 1-6 included, in order from the light source, a diffusive EUF, a prismatic brightness enhancing layer and a reflective polarizer layer.

Comparative Examples 7-12

Illumination Unit without EUF

In order to compare the performance of an illumination unit having an EUF against the performance of conventional illumination units, several sets of comparative data were obtained for an illumination unit like that shown in FIG. 8 except that the EUF 812 was replaced by a diffusing layer. The values of diffuser-g and lamp height used in these comparative examples are presented in Table III.

TABLE III

Parameter Values of Comparative Examples

| Parameter | Ex. 7 | Ex. 8 | Ex. 9 | Ex. 10 | Ex. 11 | Ex. 12 |
|---|---|---|---|---|---|---|
| Diffuser-g | 0.963 | 0.965 | 0.967 | 0.97 | 0.973 | 0.976 |
| H (mm) | 0.5 | 0.5 | 0.5 | 0.5 | 0.5 | 0.5 |

Examples 7-12 were analyzed under two different conditions, namely i) with the reflector 806 being a diffuse reflector and ii) with the reflector 806 being a specular reflector. These two different conditions are symbolized in the example name with a letter following the example number, the letter "D" representing an example that used the diffuse reflector and the letter "S" representing an example that used the specular reflector. Thus, for example, there are two sets of data for example 7. One set, labeled "7D" represents example 7 where a diffuse reflector was used and "7S" represents example 7 where a specular reflector was used. All other parameters values are the same for both the "S" and "D" examples.

Modeling Results

Figure 10:
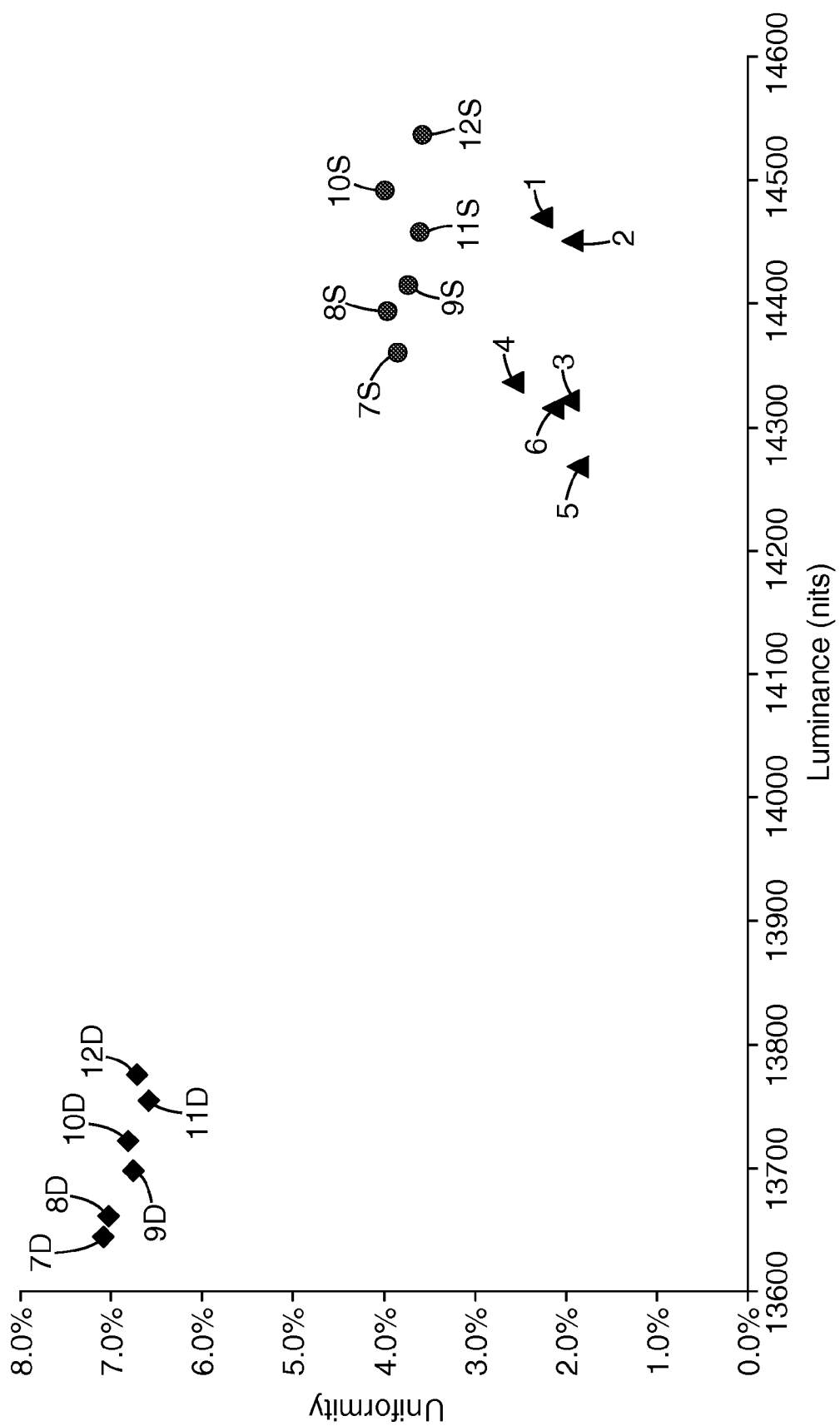
FIG. 10 presents a scatter plot of the calculated brightness uniformity plotted against luminance for various model examples.

The model was used to calculate various operating parameters of an illumination unit, including the brightness of the light above the illumination unit and the uniformity in the brightness of the light propagating in a direction perpendicular to the films of the illumination unit. FIG. 10 presents a scatter plot showing relative brightness uniformity (in %) plotted against brightness (in nits). The brightness uniformity for an example is presented as a percentage of the average brightness for that example. Comparative examples 7S-12S exhibit a slightly higher average brightness than the EUF examples (1-6), with the higher transmission examples having a higher brightness. Thus, the brightness of the EUF examples 1-6 is not significantly compromised relative to the specular reflecting comparative examples 7S-12S. The diffusive comparative examples, 7D-12D, demonstrate a level of brightness that is lower than the EUF examples 1-6.

The brightness uniformity was calculated as a ratio of the standard deviation of the uniformity across the illumination unit divided by the average brightness of light produced by the illumination unit. The resulting values are, therefore, relative uniformity values. The uniformity of the EUF examples 1-6 is significantly better than either set of comparative examples, falling in the range of approximately 1.8%-2.6%. The uniformity of the specularly reflecting comparative examples 7S-12S is in the range of approximately 3.6%-4%, while the uniformity of the diffusely reflecting examples 7D-12D falls in the range of approximately 6.6%-7.1%. Thus the modeling shows that the presence of a diffusive EUF layer can make a significant improvement in the uniformity of the light emitted by the illumination unit, while substantially maintaining the same level of brightness.

It will be appreciated that many different EUF parameters may be changed in order to achieve increased EUF performance. EUF performance may be measured by the ability of the EUF to suppress the light intensity peak above the light source. The parameters that may be varied include apex angle, the radius of curvature and the amount of flat space for both the upper and lower diverting surfaces, and also the refractive index of the EUF material.

It is believed that the two-sided EUF functions in the following manner. First, it is useful to refer to FIG. 8, which shows the EUF 812 having light diverting members 812a that are elongated in a direction parallel to the axes of the light sources 816 (into the plane of the figure). In some exemplary embodiments, this means that the light diverting members 812a are ribbed members that are elongated in the same direction as the longitudinal axis of a fluorescent lamp. With S=30 mm, D=7 mm, and H=0.5 mm, then the angle of incidence on the lower light diverting surface of the EUF 812 is 0° directly above the light source 816 and 72° at the midpoint, P, between the bulbs.

The top light diverting member 812b may be regarded as being a graduated transmission filter whose transmission depends upon the inclination angle of incident light. The bottom light diverting members 812a select a transmission angle based upon the angle of incidence $\Theta i = a\tan((D-d)/x)$, where the d is the height of the center of the light source 816 above the reflector 806, and x represents the separation between the point of incidence on the lower surface of the EUF and a point directly above the light source on the EUF. Thus, the transmission angle through the bottom light diverting members 812a is a function of the distance x from the light source 816 bulb, which in turn determines the transmission level through the upper light diverting members 812b. The EUF 812 provides a useful tool for controlling the transmission of light as a function of the distance from the light source 812, thereby affecting brightness uniformity.

Figure 11A:
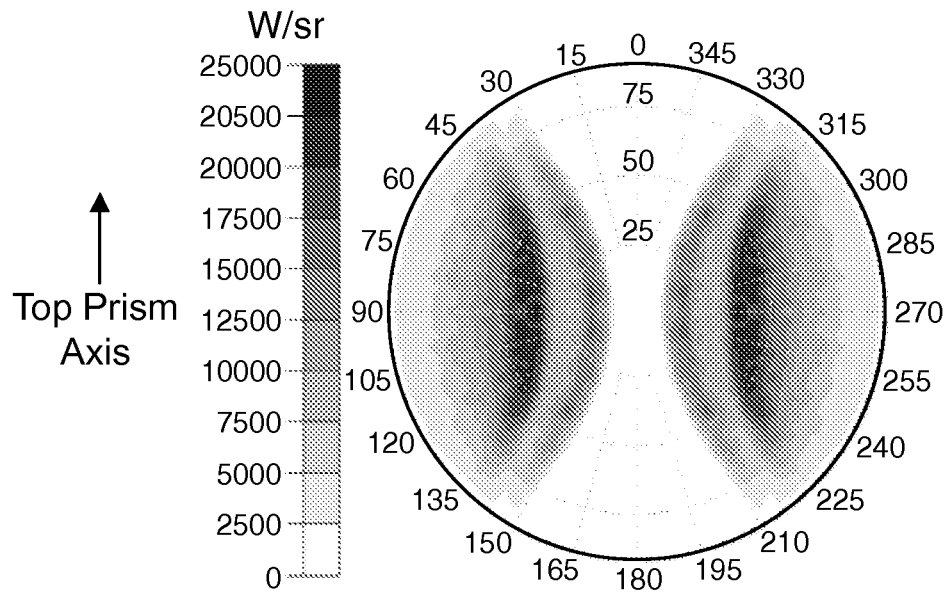
FIGS. 11A-D and 11F show various polar conoscopic plots used to describe the operation of an EUF.

To understand the combined effects of a dual-sided EUF, it is useful to consider the properties of each side separately. The effect of the upper light-diverting surface that faces away from the source of light is considered first. Such a film is like a brightness enhancing film, where the transmission of light is low for normally incident light due to total internal reflection within the prisms of the brightness enhancing film, and is significantly higher for light incident at angles higher than that which permits total internal reflection. FIG. 11A shows a polar/azimuthal map of transmitted light incident on the plano side of a plano/prism film like a prismatic brightness enhancing film. The prisms were assumed to have an apex angle 90° (F=0, R infinite). In this map, darker shading corresponds to more light being transmitted and white corresponds to zero light transmitted. The white hour-glass-shaped zone along and around the prism axis coincides with the total internal reflection (TIR) zone.

Figure 11B:
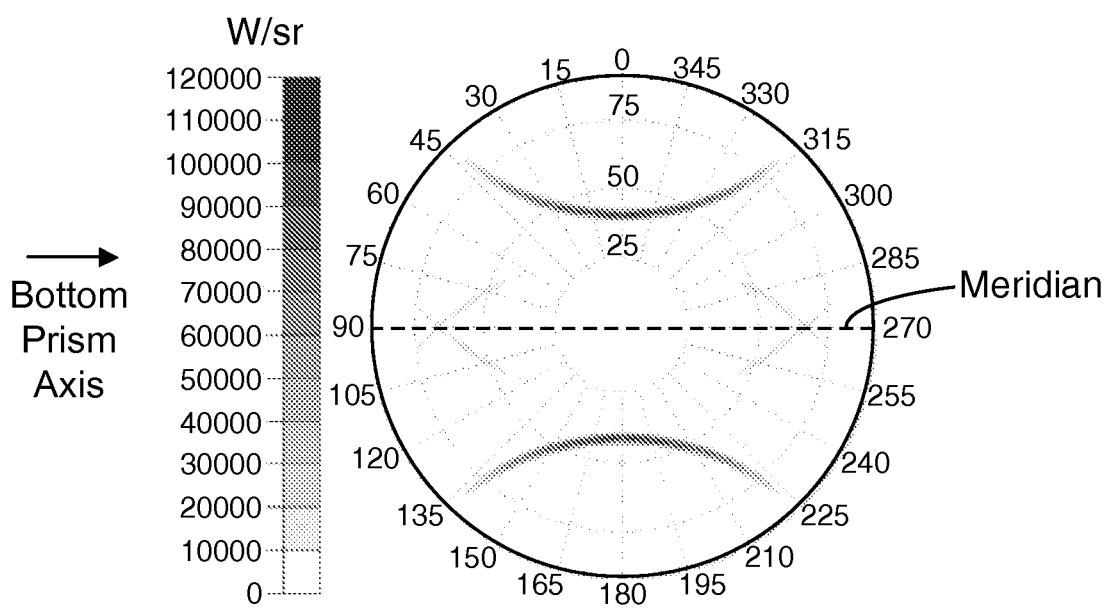
Figure 11C:
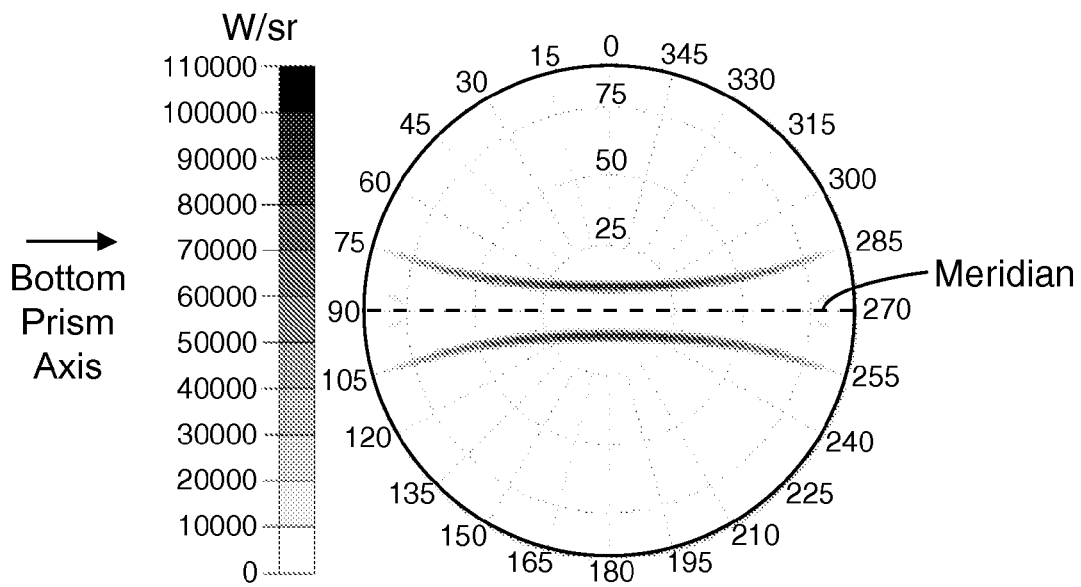
Figure 11D:
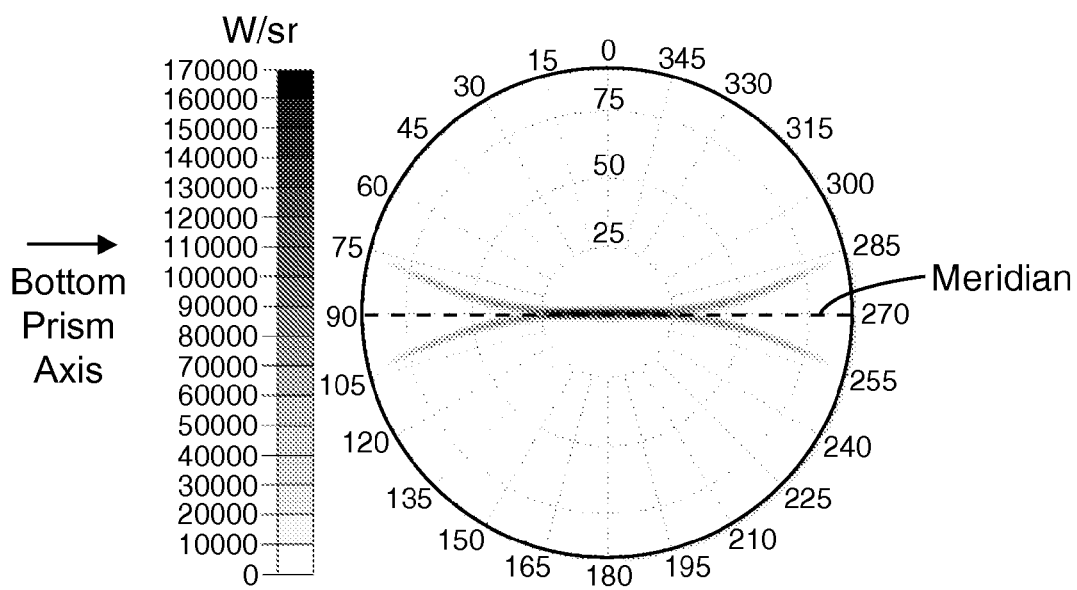
Figure 11E:
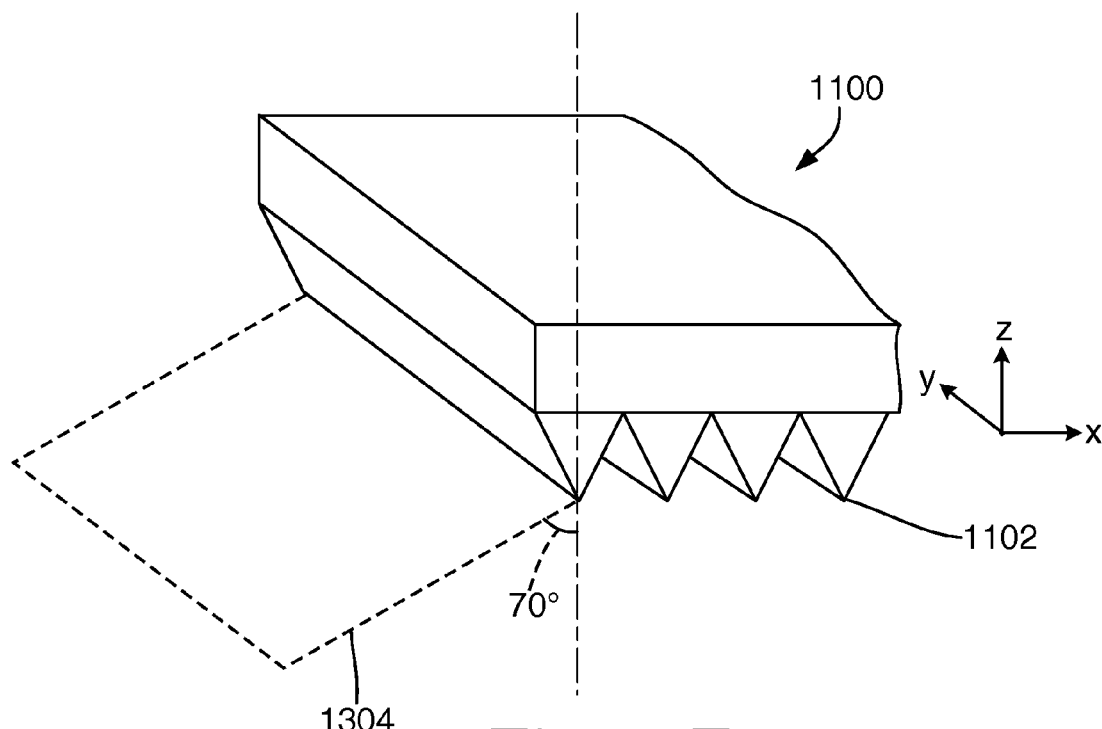
FIG. 11E schematically illustrates an exemplary model EUF.

The effect of the light-diverting surface that faces the light sources is described with reference to FIGS. 11B-11D. These figures present polar/azimuth maps of light transmitted through the structured side of a prism/plano film, where the prisms have an apex angle 70°. These figures are better understood with reference to FIG. 11E, which shows a film 1100 with prisms 1102 facing a light source (not shown). The prisms 1102 comprise light diverting members. The prisms are elongated along a direction parallel to the y-direction and the z-axis is perpendicular to the film 1100. In FIG. 11B, the plane of incidence of light is 0°, meaning that the light rays are confined to a plane normal to the prism structure and coplanar with the prism axis, i.e. are confined to the y-z plane in FIG. 11E. In FIG. 11C the plane of incidence is 70°, so light rays are confined to a plane tilted at 70° to the normal to the film and coplanar with the prism axis, plane 1304. In FIG. 11D, the light rays are confined to a plane tilted 80° to the normal and coplanar with the prism axis.

Figure 11F:
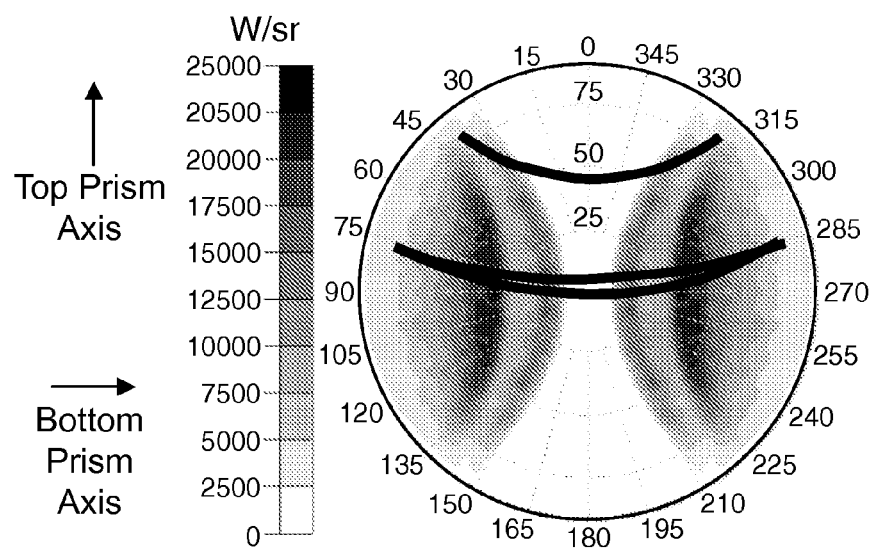

A composite polar/azimuth map of the top prism transmission and the three bottom prism incidence plane cases, namely 0°, 70°, and 80° is shown in FIG. 11F. The patterns correspond to the light diverting structures on the two sides of the EUF being oriented perpendicular to each other. In the 0° case, light is diverted away from the center meridian where TIR dominates the interaction with the top prism, hence light emitted directly upward from the bulb is mostly reflected by the EUF. In the 70° and 80° incidence cases, light is diverted toward the center meridian where the top prism TIR zone is narrow (weak reflection), hence light emitted from the lamp at steep angles and incident on the bottom prism structured surface near the midpoint between the bulbs is strongly transmitted. The combination of low transmission for light above the lamp and high transmission for light incident at the EUF at a point between the lamps results in a flattening of the overall illuminance profile, and so the illuminance can become more uniform. In FIG. 11F, there is a graduated scale of transmission for rays incident at angles between 0° and 70°, which strongly selects for light transmission near the midpoint between the bulbs. The graduated transmission scale can be tuned by adjusting the parameters of the lower and upper light diverting members, for example apex angle, facet curvature (radius), flattened or tip radius or prism tip wetout, prism axes orientation, refractive index, canted or variable apex angle prisms, and prism surface texture. The orientation of the top and bottom prism axes, i.e. the direction of the prism ridges, may be varied relative to each other and/or relative to the bulbs.

Figure 12:
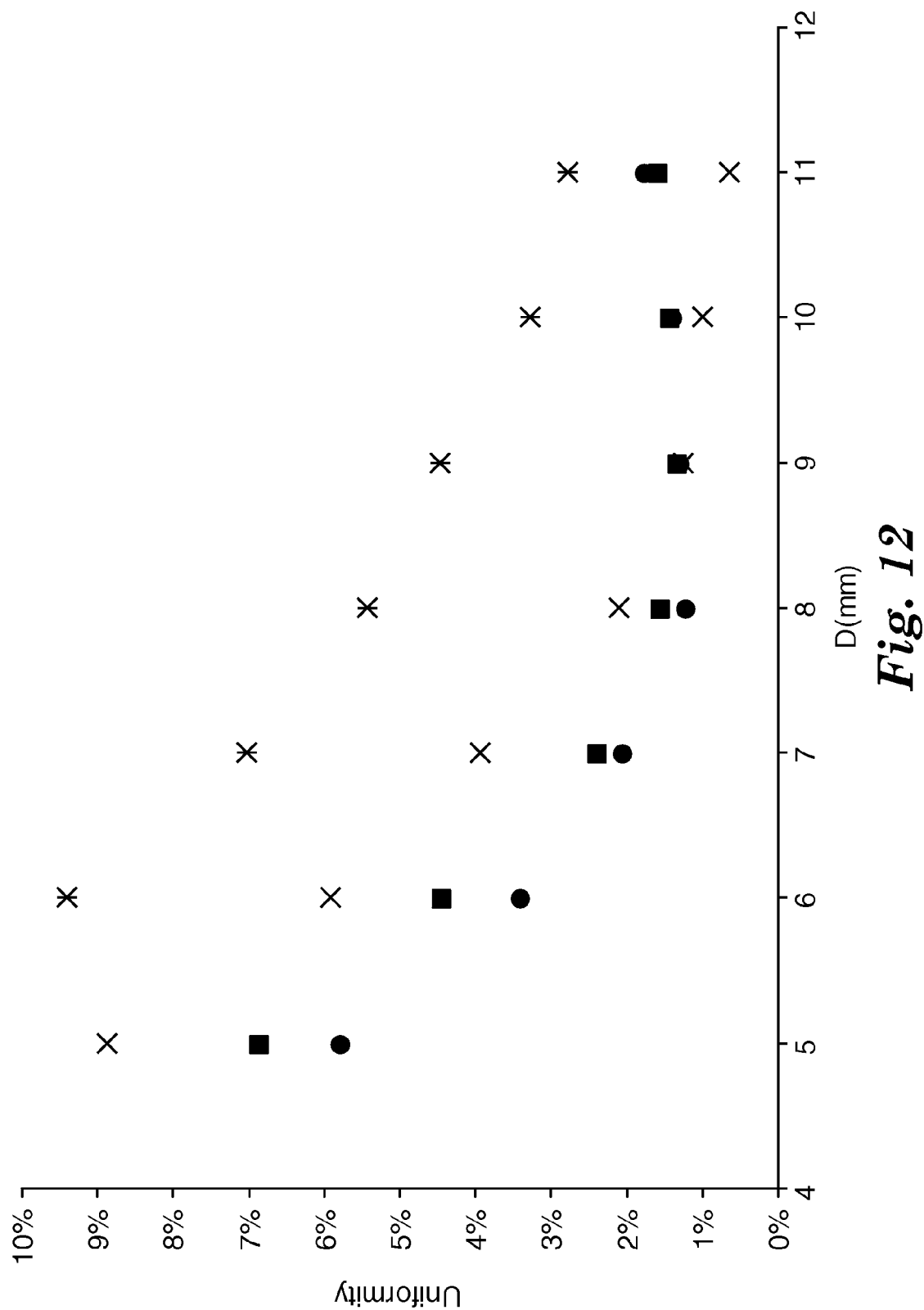
FIG. 12 shows the brightness uniformity as a function of separation between diffuser and reflector, for various model examples While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

FIG. 12 shows the calculated brightness uniformity as a function of the value D, which affects the thickness of the illumination unit. In each case the value of D was varied over the range 5 mm-11 mm. The squares and circles show the results for design like those of Examples 1 and 2. The "X"s show the results for a design like that of Example 7S while the stars show the results for Example 7D. The values of the uniformity for D=7 mm are the same as those provided in FIG. 10.

An important parameter for optimizing the performance of an illumination unit is the ratio S/D, the ratio of the inter-lamp spacing to the thickness. In order to reduce the thickness of displays, it is desired that the value of S/D be higher, however, the brightness uniformity should not be compromised. Typically, conventional displays that use fluorescent lamps with a diffuse back reflector 806 use an S/D value that is less than 2. This is confirmed by the trend of curve 1407D in FIG. 12: the brightness uniformity approaches 1% for values of D that are significantly higher than 11 mm. Recent developments using a specular back reflector 806 have demonstrated that S/D values up to about 3 are possible, while maintaining a brightness uniformity of approximately 1%, thus permitting illumination units to be reduced in thickness. This is described in greater detail in pending U.S. application Ser. No. 11/133,504.

The trends illustrated by FIG. 12 shows that the introduction of the diffusive EUF results in the achievement of reduced brightness with substantially thinner illumination units. In all the designs used for the results shown in FIG. 12, the inter-lamp spacing, S, was 30 mm. Thus, a uniformity of a little over 1% was achieved with Example 2 for values of S/D of about 3.75. The exploration of different diffusive EUF designs may lead to a system having a uniformity of less than that shown where the value of D is less than 6 mm.

It should be understood that light-diverting surfaces may take on many different types of shapes that are not discussed here in detail, including surfaces with light-diverting elements that are random in position, shape, and/or size. In addition, while the exemplary embodiments discussed above are directed to light-diverting surfaces that refractively divert the illumination light, other embodiments may diffract the illumination light, or may divert the illumination light through a combination of refraction and diffraction. The computational results described here show that different types and shapes of light-deviating layer provide the potential to increase illuminance, and reduce the variation in the illuminance, compared with a simple diffuser alone.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A directly illuminated display unit, comprising:
a display panel;
one or more light sources disposed behind the display panel and being capable of producing illumination light;
a diffusive light diverting layer disposed between the one or more light sources and the display panel, the light diverting layer comprising first light diverting members disposed on a first side of the light diverting layer facing the display panel and second light diverting members disposed on a second side of the light diverting layer facing away from the display panel, the diffusive light diverting layer further comprising diffusing particles disposed within a polymeric matrix, wherein the first side of the light diverting layer comprises at least one flat surface portion between two neighboring first light diverting members.

2. A unit as recited in claim 1, wherein at least one of the first light diverting members is formed as an elongated member extending across the light diverting layer.

3. A unit as recited in claim 2, wherein the elongated member has a height that is constant along the length of the elongated member.

4. A unit as recited in claim 1, further comprising one or more light management films disposed between the diffusive light diverting layer and the display panel.

5. A unit as recited in claim 4, wherein the one or more light management films comprise at least a first brightness enhancing film and a reflective polarizer film.

6. A unit as recited in claim 5, further comprising a second brightness enhancing film having a prismatic structure oriented substantially orthogonal to a prismatic structure of the first brightness enhancing film.

7. A unit as recited in claim 4, wherein the one or more light management films comprises a diffuser layer.

8. A unit as recited in claim 1, wherein the display panel comprises a liquid crystal display (LCD) panel.

9. A unit as recited in claim 1, wherein the one or more light sources comprise at least one of a light emitting diode and a fluorescent lamp.

10. A unit as recited in claim 1, further comprising a control unit coupled to the display panel to control an image displayed by the unit.

11. A unit as recited in claim 1, wherein light incident on the second side of the light diverting layer is diverted substantially in a first light diverting plane and light incident on the first side of the light diverting layer from the second side is substantially diverted in a second light diverting plane non-parallel to the first light diverting plane.

12. A unit as recited in claim 11, wherein the first and second light diverting planes are substantially perpendicular.

13. A unit as recited in claim 1, wherein a first portion of light from the one or more light sources that propagates within the diffusive light diverting layer in a direction substantially perpendicular to the diffusive light diverting layer is substantially transmitted through flat portions of the first light diverting elements and a second portion of light from the one or more light sources that propagates within the diffusive light diverting layer in a direction substantially perpendicular to the diffusive light diverting layer is totally internally reflected at sloped portions of the first light diverting elements.

* * * * *